Jan. 12, 1971  O. G. GARNER  3,553,811
APPARATUS FOR MAKING COAXIAL CABLE WITH WELDED METAL SHEATH
Original Filed Dec. 30, 1965
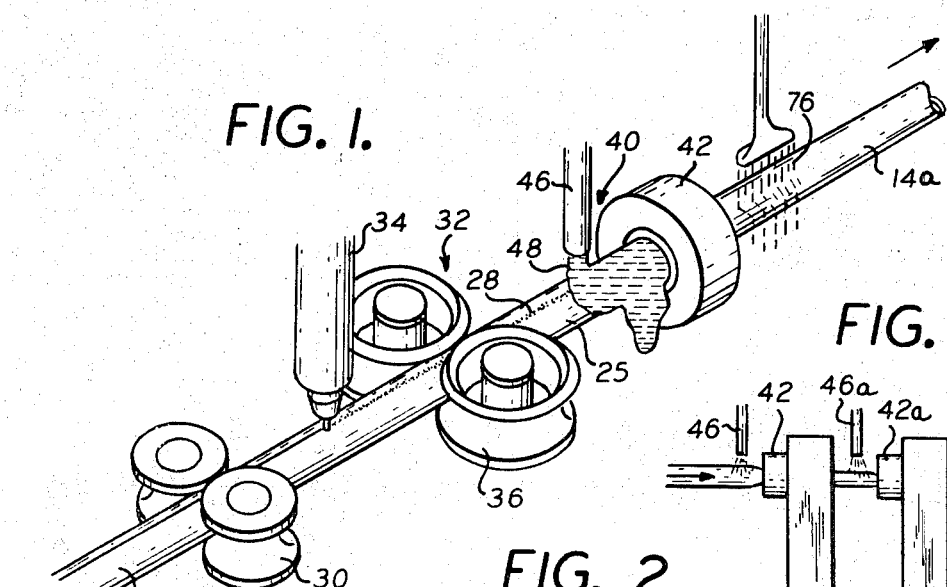
INVENTOR
OSCAR G. GARNER
BY
ATTORNEYS.

United States Patent Office 3,553,811
Patented Jan. 12, 1971

3,553,811
APPARATUS FOR MAKING COAXIAL CABLE WITH WELDED METAL SHEATH
Oscar G. Garner, Riverside, Conn., assignor to General Cable Corporation, New York, N.Y., a corporation of New Jersey
Original application Dec. 30, 1965, Ser. No. 517,706, now Patent No. 3,430,330, dated Mar. 4, 1969. Divided and this application July 18, 1968, Ser. No. 745,802
Int. Cl. B21d *39/04;* B23p *19/00*
U.S. Cl. 29—202.5                                7 Claims

ABSTRACT OF THE DISCLOSURE

This apparatus for making coaxial cable forms a longitudinally seamed tube from flat stock progressively around a continuously travelling cable core. The tube is made larger than the cable core and after welding, the assembly is pulled through a die that reduces the diameter of the tube to make it contact with and squeeze the insulation on the core. The sizing die is close to the welding region so that there is only a short distance in which the core moves at a faster rate than the tubular sheath that encloses it. Lubricant is applied to the tube ahead of the die and is washed off beyond the die before the cable enters a friction puller that pulls the cable through the die.

RELATED PATENT APPLICATIONS

This application is a division of application Ser. No. 517,706, filed Dec. 30, 1965, now Pat. No. 3,430,330. The parent case claims a method, and the present application relates to apparatus. Another related application, has issued as Pat. 3,480,724, dated Nov. 25, 1969, and is directed to the product (cable) made by the method and apparatus.

BACKGROUND AND SUMMARY OF THE INVENTION

The apparatus of the invention produces a metal-sheathed coaxial cable of greater mechanical strength and of more uniform electrical properties along its length than has been obtained with conventional apparatus.

Coaxial cables have a conductor core surrounded by electrical insulation, and the insulation is enclosed in a conducting sheath. Cables have been made by forming the sheath around the insulated core and welding the sheath progressively, but this is difficult without damaging the insulation. When the sheath has been formed and welded as a tube of substantially larger diameter than the insulation on the conductor core, so as to keep the welding operation spaced from the insulation, subsequent reduction of the sheath diameter presented serious problems.

This invention provides apparatus in which the sheath is formed and welded as a tube of larger diameter than the insuation, and in which the sheath is then drawn down in a stationary sizing die with a short distance between the region of welding and the sheath diameter reduction so that there is a minimum distance in which the core moves at a faster rate than in the sheath in which it is enclosed. This eliminates friction between the sheath and insulation which would affect the uniformity of the properties of the insulation.

The drawdown of this invention uses a sizing die and allows for control of the mechanical properties of the sheath to get higher strength; and it also provides for accurate control of the squeeze of the insulation by the sheath. Any squeeze or compression of the insulation on the core is a very important consideration in the electrical properties of the insulation, especially when foam insulation is used.

Other objects, features and advantages of the invention will appear or be pointed out as the description proceeds.

BRIEF DESECRIPTION OF DRAWINGS

In the drawing, forming a part hereof, in which like reference characters indicate corresponding parts in all the views:

FIG. 1 is a diagrammatic, isometric view showing a portion of the method and apparatus of this invention;

FIG. 2 is a diagrammatic side elevation showing the apparatus of FIG. 1 and also showing the forming of the sheath and the manner in which the sheath is pulled to advance it through the sizing die;

FIG. 2a is a fragmentary view showing a modification of FIG. 2;

FIG. 3 is a top plan view of the apparatus shown in FIG. 2;

FIG. 4 is a fragmentary view, similar to a portion of the structure shown in FIG. 2, but showing a modified construction of the apparatus for pulling the cable;

FIG. 5 is a top plan view of the apparatus shown in FIG. 4; and

FIGS. 6, 7 and 8 are greatly enlarged sectional views taken on the lines 6—6, 7—7 and 8—8, respectively of FIG. 2.

DESCRIPTION OF PREFERRED EMBODIMENT

An insulated conductor core 10 is fed to a forming station 12 where a flat metal sheathing 14 is progressively formed into a tube around the conductor core 10. This forming of the metal sheath 14 is done in a forming die 16 which is merely representative of means for bending a flat strip into a tube with a longitudinal seam.

The conductor core 10 has a center conductor 20 (FIG. 6) surrounded by electrical insulation 22. This electrical insulation is preferably a plastic foam such as polyethylene having a percent of air of about 45 to 55. These values are given by way of illustration. For a particular cable, the plastic foam is kept substantially uniform along the entire length of the cable since variations in the density of the foam, or other physical characteristics, affect the electrical characteristics of the cable.

The radial thickness of the insulation 22 depends upon the diameter of the conductor 20 and is preferably at least one and one-half times as great as the diameter of the conductor. The radial thickness of the insulation 22 is preferably within a tolerance of 0.002 inch, throughout the length of the cable, for conductor cores of less than one-half inch in diameter, and the tolerance is somewhat greater for larger diameters.

The cable consisting of the conductor core 10, surrounded by the formed metal sheath 14, is indicated by the reference character 25. The formed sheath or tube, designated as 14', in FIG. 7, is of substantially larger diameter than the conductor core 10. The tube 14' has a longitudinal seam 28 which is spaced from the insulation of the conductor core 10, so that the seam can be welded without damage to the insulation of the conductor core.

Beyond the forming die 16, the cable 25 travels through a roll stand 30 at a welding station 32. There is a torch 34 at the welding station in position to weld the seam 28 as the cable 25 travels from the roll stand 30 to another roll stand 36, spaced closely behind the roll stand 30 at the welding station 32.

Close behind the roll stand 36, there is a sizing station 40 which includes a bell or sizing die 42, carried by a supporting frame 44, and there is a pipe 46 immediately in front of the bell or sizing die 42 for pouring a lubricant 48 (best shown in FIG. 1) over the outside of the cable sheath 14'.

The sizing and sinking is done by a single stationary die 42 or by multiple dies. The die or dies are detachable from the supporting frame 44 so that dies of other size can be substituted when operating with different sizes of cables or when a different degree of drawdown is desired for a cable of the same size.

The sizing station 40 is located close to the forming station 12 and welding station 32 so that the same attendant can inspect both the welding and the sizing operations. This distance is preferably not greater than about 8 feet. The die is about 2 to 4 feet beyond the torch 34.

Another advantage of the close proximity of the welding and sizing stations is that the roll stand 36 at the welding station, in addition to positioning the cable accurately for welding, serves also as a pair of damping rolls to minimize the effect of any movement of the cable 25 as it enters the sizing die 42. This obtains more uniform production, especially since slight movements of the order of 0.005 to 0.010 inch at the welding point, seriously affect the quality of the weld.

Another important advantage of having the forming and welding station close to the sizing station is that the conductor core 10 moves faster than the tube 14' before the tube has passed through the sizing die 42. This is because the conductor core 10 advances at the same speed as the reduced-diameter portion of the tube beyond the sizing die, and because of the elongation of the tube in the sizing die 42, the lineal speed of the tube ahead of the sizing die is less than that beyond the sizing die. The tube beyond the sizing die 42 is indicated by the reference character 14a.

At regions where the conductor core 10 and the sheath tube 14₂ be reduced sufficiently to contact the conductor contacting surfaces of the conductor core 10 and the sheath tube 14'. This friction contact is against certain areas of the conductor core and not against the upper areas where there is clearance between the conductor core and the tube. It is, therefore, desirable to reduce to a minimum the travel of the conductor core 10 while in contact with the tube and moving at a different speed from the tube so as to avoid wear, and especially uneven wear, of the insulation.

As the tube or sheath 14' is drawn down tight around the conductor core, the friction increases and it is desirable to have this operation done in as short a length as possible so that the core and sheath can be brought to the same speed promptly where relative movement no longer occurs. This makes the use of the stationary sizing die 42 advantageous because such dies effect a drawdown in a short tube length.

The reduction in the diameter of the tube or sheath 14' in the sizing die 42 is preferably between about 5% to 40%; the amount of reduction depending upon the original width of the metal sheath 14 as compared to the circumference of the conductor core 10. It is desirable that the tube 14' be reduced sufficiently to contact the conductor core 10 around the entire circumference of the core and it is preferable that the sheath impart some squeeze to the insulation on the conductor core. The reduction of the tube or sheath 14' in the sizing die is preferably a cold working of the metal so that the operation improves the mechanical properties of the sheath by imparting to it a higher strength. The preferred material for the sheath is aluminum, but other metals can be used. Copper is a suitable substitutes for the aluminum, but adds somewhat to the cost and weight.

The wall thickness of the metal sheath is not reduced by its passage through the sizing die 42 and the effect of the die is merely to lengthen the tube as the diameter reduces. This is a "sinking" operation as differentiated from a "drawing" process which would reduce the sheath thickness as well as its size. It is, of course, necessary to use metal strip of a composition and temper which will elongate in the die 42 in the manner required by the method of this invention.

Starting with fully annealed aluminum of the electrical conductive grade, the working in the die 42 results a harder tube; up to medium or half hard depending upon the diameter reduction.

The effect of squeeze of the insulation 22 by the drawn down sheath of the cable 14a on the electrical properties of the insulation is critical. Excessively squeezed cores produce poor SRL (structural return loss) values which drop sharply with increase in squeezing. The squeeze for a core of approximately one-half inch in diameter, with a .098 inch conductor, should not be above about 15 mils. The squeeze also affects the impedance value, higher squeezing resulting in lower impedance and a lighter squeeze resulting in higher impedance. To obtain the desired electrical properties, therefore, the cable core must be properly designed in accordance with the intended reduction in diameter of the sheath after welding and with a range of squeeze between about 5 and 15 mils. Minimum SRL is 26 db and preferably about 32 db for 8 to 220 megacycles.

A more highly squeezed core requires more force to pull or slip the sheath over the core. With this invention, a pull of seventy pounds per 6 inches of the core to move it axially with respect to the sheath in the final cable, the test being made by cutting back a portion of the sheath, indicates a desirable degree of squeeze with a core diameter of about one-half inch. For other cable sizes, the force is directly proportional to the core diameter. The insulation sticks to the center conductor and does not pull away from it as the result of sudden changes in outer temperature.

FIGS. 2 and 3 show a capstan 50 for pulling the cable 14a with sufficient force to advance the welded sheath continuously through the sizing die 42 at uniform speed.

The capstan 50 includes two drums 52 and 54, mounted for rotation about parallel axles 56 carried by a fixed frame 57. The drums 52 and 54 preferably have suitable grooves for receiving the cable 14a, and the drums 52 and 54 are driven by power with any conventional capstan drive. A pull is exerted on the cable 14a, where it comes off the capstan, as indicated by the arrow 60, so as to keep the convolutions of the cable 14a tight on the drums and because of the substantial length of the cable on the drums 52 and 54 and the angular wrap of the cable around the drums, a substantial friction is developed which advances the cable with uniform speed and without slippage on the drums 52 and 54, even though the outside of the cable remains coated with lubricant from the lubricant supply pipe 46.

FIGS. 4 and 5 show a different construction of the apparatus for pulling the sheath tube through the sizing die 42. Instead of the drum capstan, the apparatus illustrated in FIGS. 4 and 5 uses a caterpillar capstan 64. This includes an upper endless belt 66 which passes around wheels 67 and 68, driven by power and located in such position that the lower run of the belt 66, which is moving in the direction of the arrow 70, contacts with the cable 14a.

The caterpillar capstan 64 includes a similar endless belt 66' which runs on wheels 67' and 68' driven by power and located in position to have the upper run of the belt 66' contact with the cable 14a to move it in the direction of the arrow 70'.

The belts 66 and 66' are pressed against the cable 14a with sufficient force to develop substantial friction but because of the reduced area of contact and the lack of snubbing effect as compared with the round or drum capstan 60, the caterpillar capstan 64 does not have as much friction and it is desirable to remove any lubricant from the cable 14a before gripping it with the capstan 64.

In order to remove the lubricant 48 from the cable 14a, there is a spray nozzle 74 located just beyond the die 42 in position to direct a plurality of liquid streams 76, best shown in FIG. 1, against the cable 14a. These liquid streams 76 are sufficient in number and are of enough force to wash off the lubricant 48 around the entire circumference of the cable 14a. Strong water streams can be used, or streams of liquid having some solvent action can be substituted, if desired.

The preferred embodiments of the invention have been illustrated and described, but changes and modifications can be made and some features can be used in different combinations without departing from the invention, as defined in the claims.

I claim:

1. Apparatus for making coaxial cable having a conductive core uniformly covered with an insulated portion, including means for supplying an insolated conductor core continuously to a tube-forming station, means at said station for forming a longitudinally seamed tube sheath progressively around the continuously traveling insulated portion, said insulated portion being of less outside diameter than the inside diameter of the tube, a welding station including a torch that welds the seam as it moves beyond the forming means, a die through which the welded tube passes, said die being the next working element through which the tube passes after leaving the welding station, and said die being at a sufficiently short distance beyond the welding station so as to reduce the distance through which the insulated portion and sheath move in contact with one another at different speeds and thereby to prevent wear of the insulated portion, and said die having an inside diameter which is correlated with the diameter of the insulated portion so as to reduce the inside diameter of the tube to slightly less than the diameter of the insulated portion and with the wall thickness of the tube uniform around its circumference to lightly squeeze the insulated portion substantially uniformly around the circumference thereof, and means beyond the die for pulling the cable through the die.

2. The apparatus described in claim 1 characterized by the forming means forming the tube with the seam spaced from contact with the insulated portion, the die being a stationary die, a roll stand of the welding station between the torch and the die including rolls that contact with the tube near the weld whereby heat from the weld region of the tube flows into the rolls to reduce the temperature of the metal of the tube before it leaves the welding station and is reduced and brought into contact with the insulated portion by reduction of the tube diameter in the die.

3. The apparatus described in claim 1 characterized by the downstream end of the means for forming the tube being at an axial distance within about 8 feet of the die to prevent wear of the insulated portion as the result of different speeds of travel of the insulated portion and the tube.

4. The apparatus described in claim 2 characterized by the stationary die being about 2 to 4 feet beyond the torch.

5. The apparatus described in claim 1 characterized by the forming means including forming apparatus that receives a substantially flat strip of a width greater than the circumference of the insulated portion and that shapes the flat strip to a closed tube, the insulated conductor being supplied to the tube after the tube is partially formed, a roll stand at the welding station adjacent to the torch for damping transverse movement of the seam while under the welding torch to limit such transverse movement to less than about 0.010 inch, the die being a bell through which the cable is pulled, said bell being of a diameter to reduce the inside diameter of the sheath by between 5 and 25% and to a diameter that squeezes the insulated portion with a limited force that leaves the cable with a minimum structural return loss of 26 db, and the pulling means beyond the die having surfaces that contact with the sheath with friction forces sufficient to pull the cable through the bell.

6. Apparatus for making coaxial cable including means for forming a longitudinally seamed tube progressively around a continuously traveling insulated conductor core of less outside diameter than the inside diameter of the tube, a torch that welds the seam as it moves beyond the forming means, a die through which the welded sheath passes, said die being of a size to reduce the tube to an inside diameter at least as small as the outside diameter of the core, and means beyond the die for pulling the cable through the die and characterized by a conduit ahead of the die in position to supply a coating of lubricant over the surface of the sheath just before the sheath enters the die, and the pulling means beyond the die including a round capstan having drum means around which successive helical convolutions of the cable pass to obtain the necessary area of friction contact of the cable with the pulling means for pulling the cable through the die.

7. Apparatus for making coaxial cable including means for forming a longitudinally seamed tube progressively around a continuously traveling insulated conductor core of less outside diameter than the inside diameter of the tube, a torch that welds the seam as it moves beyond the forming means, a die through which the welded sheath passes, said die being of a size to reduce the tube to an inside diameter at least as small as the outside diameter of the core, and means beyond the die for pulling the cable through the die and characterized by a conduit ahead of the die in position to supply a coating of lubricant over the surface of the sheath just before the sheath enters the die, a washer immediately beyond the die in position to wash the lubricant from the surface of the sheath, and the pulling means being beyond the washer and including roll means over which the cable travels and that exert a friction force against the cable on the outside surfaces thereof to grip the cable frictionally and apply the necessary force to pull the cable through the die.

References Cited

UNITED STATES PATENTS

| 2,088,446 | 7/1937 | Specht | 29—474.1 |
| 3,183,300 | 5/1965 | Jachimowicz | 29—474.1X |
| 3,328,874 | 7/1967 | Davis et al. | 228—17X |

GIL WEIDENFELD, Primary Examiner

U.S. Cl. X.R.

29—33.5; 228—17

UNITED STATES PATENT OFFICE
CERTIFICATE OF CORRECTION

Patent No. 3,553,811　　　　　　　　　　Dated　January 12, 1971

Inventor(s)　　Oscar G. Garner

It is certified that error appears in the above-identified patent and that said Letters Patent are hereby corrected as shown below:

Column 3, line 35, "tube $14_2$ be reduced sufficiently to contact the conductor" should read -- tube 14′ move at different speeds, there is friction between --. Column 4, lin 70, "60" should read -- 50 --. Column 6, line 49, "surfaces" should read -- surface --.

Signed and sealed this 1st day of June 1971.

(SEAL)
Attest:

EDWARD M. FLETCHER, JR.　　　　　　　　WILLIAM E. SCHUYLER, JR.
Attesting Officer　　　　　　　　　　　Commissioner of Patents